(12) United States Patent  
Naik et al.

(10) Patent No.: US 8,736,216 B2
(45) Date of Patent: May 27, 2014

(54) ELECTRIC DRIVE WITH ELECTRONICALLY SCALABLE RECONFIGURABLE WINDING

(75) Inventors: Sanjeev M. Naik, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

(21) Appl. No.: 13/151,532

(22) Filed: Jun. 2, 2011

(65) Prior Publication Data
US 2012/0306424 A1 Dec. 6, 2012

(51) Int. Cl.
*H02P 1/42* (2006.01)
(52) U.S. Cl.
USPC ........... 318/495; 318/724; 318/297; 318/122; 310/198; 310/180; 310/140
(58) Field of Classification Search
USPC ......... 318/495, 434, 490, 808, 607, 724, 297, 318/122; 310/198, 180, 140
See application file for complete search history.

(56) References Cited

U.S. PATENT DOCUMENTS

| 4,785,213 | A | * | 11/1988 | Satake | 310/116 |
| 6,097,127 | A | | 8/2000 | Rivera | |
| 6,633,151 | B2 | * | 10/2003 | Johnson | 318/801 |
| 7,034,426 | B2 | * | 4/2006 | Goche | 310/184 |
| 7,759,966 | B2 | | 7/2010 | Cawthorne et al. | |
| 7,944,187 | B2 | * | 5/2011 | Dooley | 322/46 |
| 2010/0019714 | A1 | | 1/2010 | Fuchs | |

FOREIGN PATENT DOCUMENTS

CN 1384584 A 12/2002

* cited by examiner

*Primary Examiner* — Eduardo Colon Santana
*Assistant Examiner* — Iftekhar Mustafa

(57) ABSTRACT

A stator phase circuit for an electric machine includes a phase winding circuit including a plurality of series coupled sub-winding circuits, each sub-winding circuit includes a respective sub-winding coupled in parallel across a respective first controllable switch.

14 Claims, 6 Drawing Sheets

US 8,736,216 B2

ELECTRIC DRIVE WITH ELECTRONICALLY SCALABLE RECONFIGURABLE WINDING

TECHNICAL FIELD

This disclosure is related to multi-phase, permanent magnet electrical machines.

BACKGROUND

The statements in this section merely provide background information related to the present disclosure and may not constitute prior art.

Hybrid vehicle systems typically utilize one or more electric, permanent magnet machines (e.g., electric drive) as part of a transmission system that provides a propulsion source to complement the engine. The accuracy of the manufacture, service and operation of these machines to produce specified torque profiles is important to the consistent and efficient operation of the vehicle.

Electric machines can be constrained in their torque capability at high speeds, due to operating voltage limits. At a given operating speed of the electric machine, the torque profile begins to decrease as the operating speed of the electric machine increases.

It is known, for example, to utilize flux weakening between a stator and a rotor of the electric machine to extend the operating speed range. It is further known to switch between coils wound to the stator to enable a two mode, series and parallel connection.

It is desirable to cover mode switching between a plurality of operating speed ranges of the electric drive to optimize the torque output of the torque profile as the operating speed increases. Likewise, it would be desirable to apply a method of scalability according to the number of speed ranges or modes desired and the number of phase winding circuits utilized.

SUMMARY

A stator phase circuit for an electric machine includes a phase winding circuit including a plurality of series coupled sub-winding circuits, each sub-winding circuit includes a respective sub-winding coupled in parallel across a respective first controllable switch.

BRIEF DESCRIPTION OF THE DRAWINGS

One or more embodiments will now be described, by way of example, with reference to the accompanying drawings, in which.

DETAILED DESCRIPTION

Figure 1:
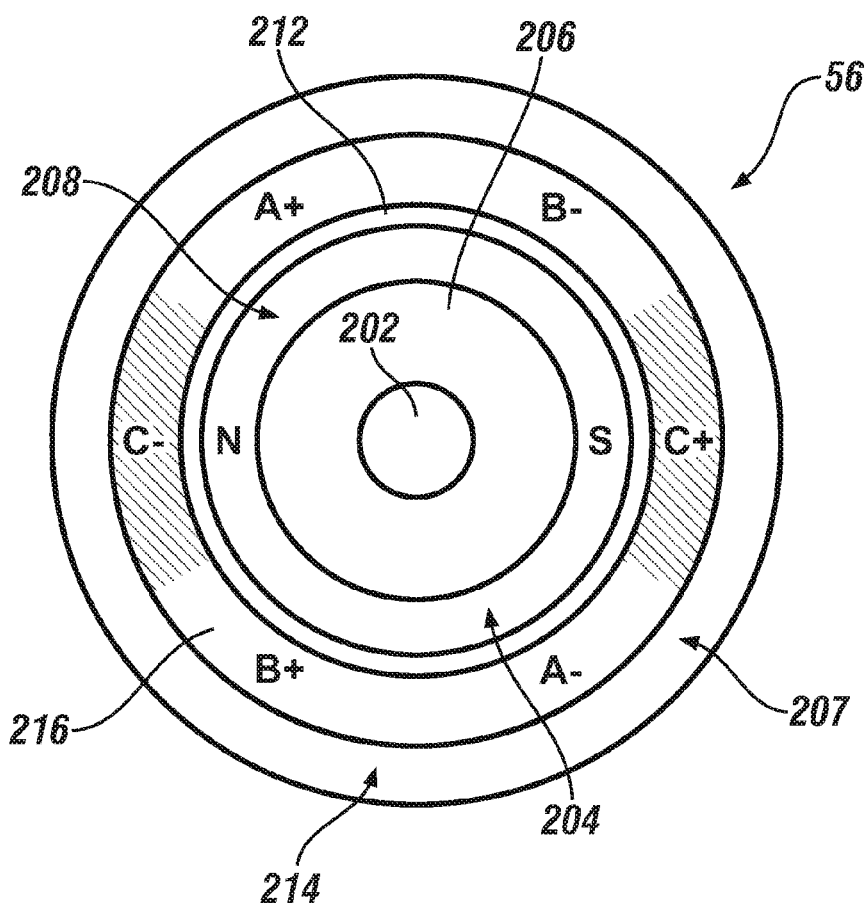
FIG. 1 schematically illustrates a cross-sectional view of an exemplary radial flux with inner rotor electric machine in accordance with the present disclosure.

Referring now to the drawings, wherein the showings are for the purpose of illustrating certain exemplary embodiments only and not for the purpose of limiting the same, FIG. 1 schematically illustrates a cross sectional view of a radial flux with inner rotor electric machine 56 in accordance with the present disclosure. The electric machine 56 in FIG. 1 is only exemplary and is described to provide a greater understanding of the exemplary multi-phase winding circuit described below. The electric machine can be a multiphase permanent magnet electrical machine, an induction machine or a wound rotor synchronous machine. The radial flux with inner rotor electric machine can apply to different machine sub-topologies. For instance, among the class of radial machines, the methods disclosed herein can apply to outer, inner or dual stator machines.

The electric machine 56 includes a shaft 202 for providing input to the electric machine 56 and receiving output from the electric machine 56. A rotor 204 is coupled to the shaft 202 and includes a rotor core 206 with permanent magnets 208 mounted thereon. A stator 207 is separated from the rotor 204 by an air gap 212 and includes a stator core 214 with phase winding circuits 216 positioned thereon. As the rotor 204 rotates with respect to the windings 216 on the stator 207, a voltage is induced in the windings 216. The voltage is a function of various parameters of the electric machine design including, the number of winding 216 turns of the stator 207; the magnet field strength of the rotor 204; and the permeability of the flux path of the electric machine 56. The magnitude of the induced voltage is the product of the angular velocity of the rotor 204 and a function of the number of turns of the windings 216, the permeability of the material of the stator 207, and the strength of the magnets 208.

This disclosure is not limited to the rotor core 206 including permanent magnets 208 mounted thereon and the stator core 215 with phase winding circuits 216 positioned there on and can include the stator core 215 including the permanent magnets 208 mounted thereon and the rotor core 206 with the phase winding circuits 216 positioned thereon. Hence, the permanent magnet electric machine includes at least one stator and at least one rotor co-axial with the stator and mounted for rotation relative to the stator, one of the rotor or stator having a plurality of permanent magnets mounted circumferentially thereon or having phase winding circuits and the other of the rotor or stator having the phase winding circuits.

Figure 2:
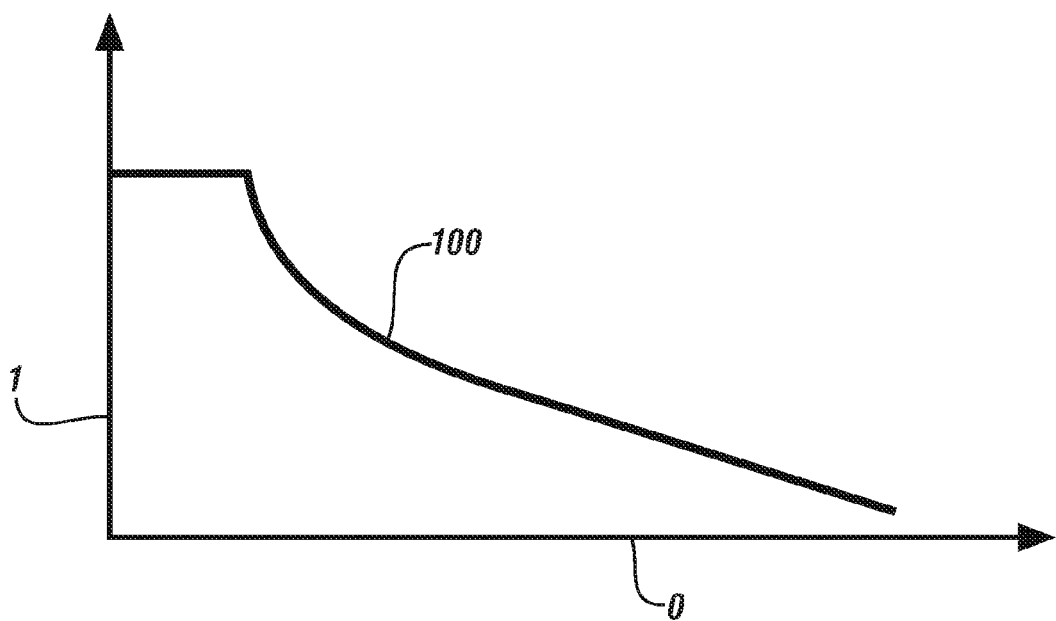
FIG. 2 graphically illustrates a torque profile according to operating speed of an electric machine in accordance with the present disclosure.

FIG. 2 graphically depicts a torque profile 100 according to operating speed of an electric machine in accordance with the present disclosure. The axis of ordinate 1 denotes torque output of the electric machine. The axis of abscissa 0 denotes operating speed range of the electric machine. The torque profile 100 begins to decrease at an electric machine specific operating speed range. It is desirable to increase the torque output capability of the electric machine throughout the operating range of the electric machine.

Embodiments envisioned include utilizing a multi-phase winding circuit for an electrical machine. For instance, the multi-phase winding circuit can include three-phases, five-phases or any desired number of phases. For simplicity, this disclosure will refer to the electrical machine to include three-phases. The phase winding circuit for a single phase of the multi-phase electrical machine discussed herein will be identical regardless of the number of phases utilized by the electrical machine. Each phase winding circuit includes a plurality of series coupled sub-winding circuits, each sub-winding circuit includes a respective sub-winding coupled in series with a first controllable switch (e.g., series switch), and a respective second controllable switch (e.g., parallel switch) coupled in parallel across the corresponding series coupled sub-winding and first controllable switch. The first and second controllable switches are bi-directional switches operable between open and closed positions where the first and second controllable switches are never both in the open and closed positions at the same time.

Alternatively, methods disclosed herein can be applied to each sub-winding circuit including a respective sub-winding coupled in parallel across a respective first controllable switch (e.g., parallel switch) without the need of the series switch. However, managing circulating currents among the plurality of series coupled sub-winding circuits transitioning from being in-circuit to out-of-circuit during transitions between operating speed ranges of the electrical machine when only utilizing the parallel switch can be tedious due to torque disturbances from large voltages induced during the transitions. The embodiments discussed herein will refer to each of the sub-winding circuits including both, first and second controllable switches.

Figure 3:
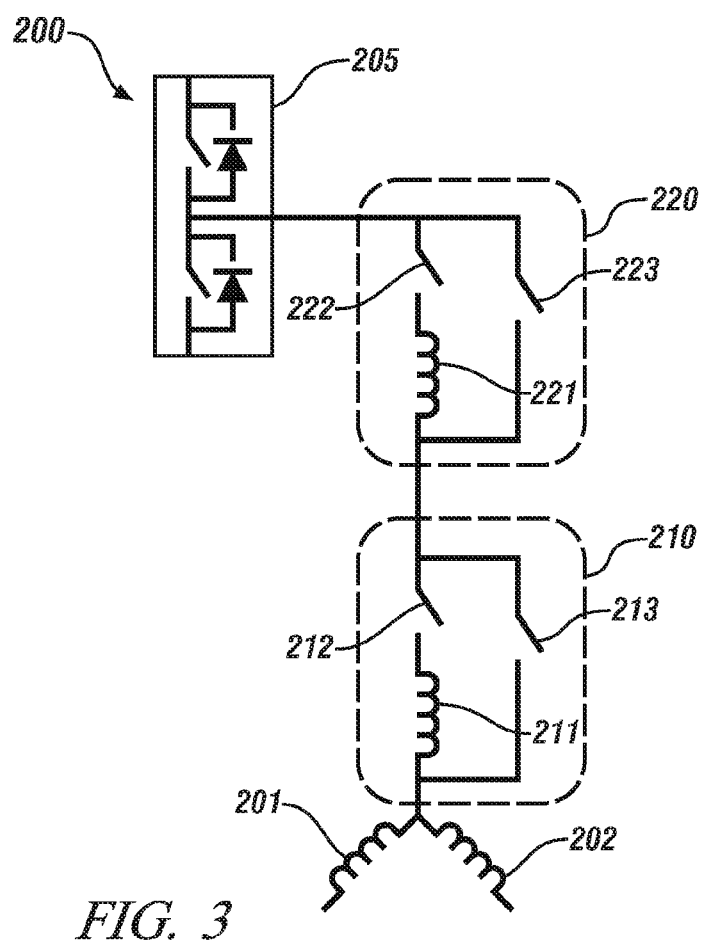
FIG. 3 schematically illustrates a phase winding circuit 200 of an electric machine including a plurality of series coupled sub-winding circuits 210,220 in accordance with the present disclosure.

In an exemplary embodiment of the present disclosure, FIG. 3 schematically illustrates a phase winding circuit 200 for an electric machine. As aforementioned, the phase winding circuit 200 can be one of a plurality of phase winding circuits of a stator phase circuit and can apply to any number of phases for the electric machine. In the non-limiting embodiment, three phase winding circuits 200, 201, 202 having a Y-configuration are illustrated. Phase winding circuit 200 will be discussed herein, where all methods and configurations with respect to phase winding circuit 200 are identically applied to phase winding circuits 201, 202.

The phase winding circuit 200 includes a plurality of series coupled sub-winding circuits 210, 220. The sub-winding circuits 210,220 include respective sub-windings 211,221 coupled in series with respective first controllable switches 212,222, and respective second controllable switches 213, 223 coupled in parallel across the corresponding series coupled sub-windings 211,221 and first controllable switches 212,222. The switches 212,213,222,223 are bi-directional switches operable between open and closed positions, the first controllable switches 212,222 and the second controllable switches 213,223 are never both in the open and closed positions at the same time.

The sub-winding circuits 210, 220 are coupled in series, where the phase winding circuit 200 has three desirable winding turn ratios (i.e., three effective turn ratios) based on respective combinations of winding turn ratios of two sub-windings 211 and/or 221 where each sub-winding 211,221 corresponds to a respective one of the two sub-winding circuits 210,220. Each respective winding turn ratio of the sub-windings is different from the other winding turn ratios. For example, the winding turn ratio of sub-winding 211 is different from the winding turn ratio of sub-winding 221. Each of the three desirable winding turn ratios include at least one of the two sub-winding circuits 210,220 in circuit. In other words, the respective winding turn ratios of each of the sub-windings 211,221 are selectively combinable to yield desirable winding turn ratios (i.e., effective winding turn ratios) of the phase winding circuit 200 based on variations of at least one of the sub-winding circuits 210,220 in circuit. Further, each of the three desirable winding turn ratios (i.e., three effective turn ratios) of the exemplary phase winding circuit 200 correspond to respective operating speed ranges of the electric machine. Hence, the phase winding circuit 200 including the two sub-winding circuits 210,220 is configurable between three operating speed ranges of the electric machine. Therefore, transitions occur between the variations of at least one of the sub-winding circuits 210,220 in circuit based on transitions between the desired winding turn ratios during transitions between the operating speed ranges of the electrical machine. The transitioning between variations of at least one of the sub-winding circuits 210,220 in circuit selectively occurs when an in-phase current across the phase winding circuit 200 is substantially zero. As aforementioned, each sub-winding circuit is in circuit when the respective first controllable switch (i.e., series switch) is closed and the respective second controllable switch (i.e., parallel switch) is open. Likewise, each sub-winding circuit is not in circuit (i.e., out-of-circuit) when the respective first controllable switch is open and the respective second controllable switch is closed. Hence, when a sub-winding circuit is in circuit, the respective sub-winding is capable of being energized and contributing its respective winding turn ratio toward a desirable winding turn ratio (i.e., effective winding turn ratio).

The phase winding circuit 200 further includes a respective half-bridge 205 associated with an inverter to facilitate power flow to and from the electric machine. Specifically, the half-bridge 205 can be coupled in series to the sub-winding circuit 220. Each of phase winding circuits 201,202 includes a respective half-bridge associated with the inverter to facilitate power flow to and from the electric machine.

Figure 4:
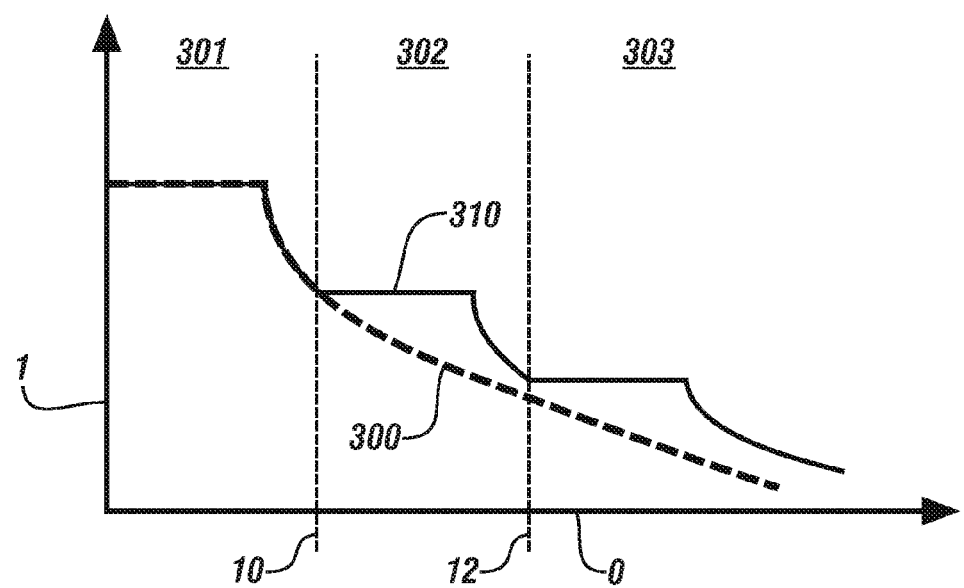
FIG. 4 graphically illustrates an increased torque capability profile 310 over an entire operating speed range of an electrical machine based on utilizing the phase winding circuit 200 of FIG. 3 in accordance with the present disclosure.

FIG. 4 graphically illustrates an increased torque capability profile 310 over an entire operating speed range of the electrical machine based on utilizing the phase winding circuit 200 of FIG. 3 in accordance with the present disclosure. The axis of ordinate 1 denotes torque. The axis of abscissa 0 denotes the entire operating speed range of the electrical machine. Dashed line 300 denotes the torque profile without utilizing the implementation of the two series coupled sub-windings 210, 220 selectively operable between three desirable winding turn ratios (i.e., effective winding turn ratio) based on combinations of respective turn ratios of the two sub-windings 211,221 when at least one of the two sub-winding circuits 210,220 are in-circuit. Hence, a sub-winding is contributing toward a desired winding turn ratio when the respective sub-winding circuit is in circuit. Dashed vertical line 10 denotes a first speed range limit. Dashed line 12 denotes a second speed range limit. Area 301 encompasses a low-speed range less than the first speed range limit corresponding to operating Mode 1. Area 302 encompasses a mid-speed range between the first and second speed range limits 10,12, respectively, corresponding to operating Mode 2. Area 303 encompasses a high-speed range at least the second speed range limit 12 corresponding to operating Mode 3.

Table 1 is provided as a key of the series coupled sub-winding circuits 210,220 having three desirable winding turn ratios based on respective combinations of winding turn ratios of two sub-windings 211,221 where each sub-winding corresponds to a respective one of the two sub-winding circuits 210,220. Each of the three desirable winding turn ratios have at least one of the two sub-winding circuits 210,220 in circuit. Each of the three desirable winding turn ratios corresponds to respective ones of the three operating speed ranges or modes. The numerically labeled blocks and the corresponding positions of the controllable switches with respect to the desired winding turn ratio, and corresponding operating mode, are set forth as follows.

TABLE 1

| MODE | 213 | 212 | 223 | 222 | in circuit |
|---|---|---|---|---|---|
| 1 | Open | Closed | Open | Closed | 220, 210 |
| 2 | Closed | Open | Open | Closed | 220 |
| 3 | Open | Closed | Closed | Open | 210 |

Figure 5:
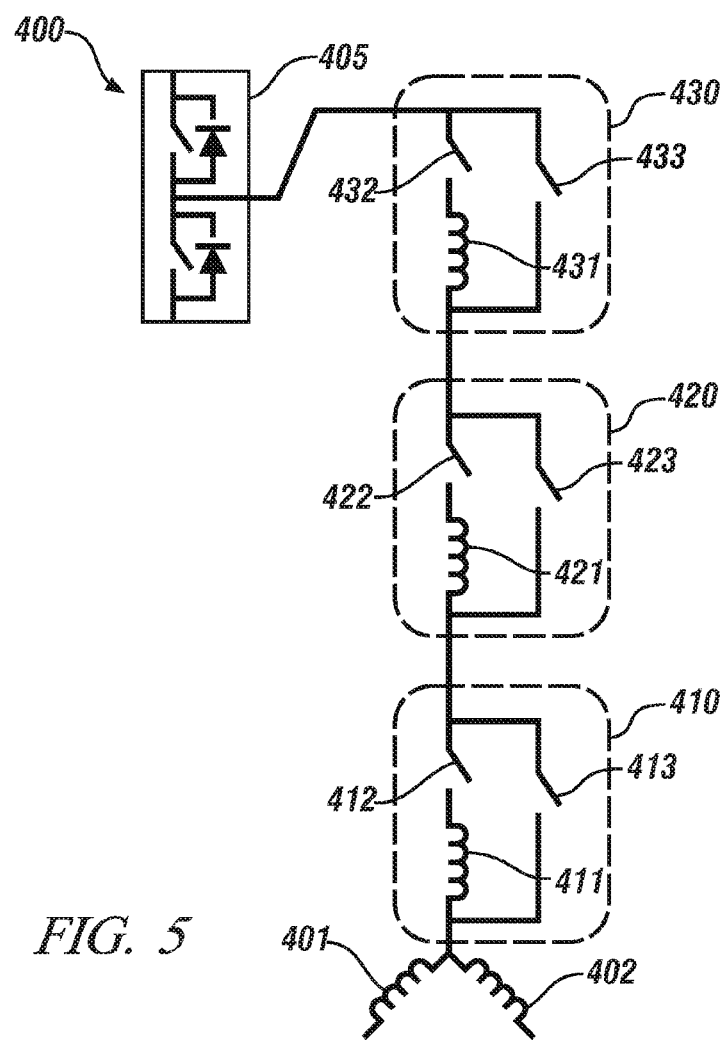
FIG. 5 schematically illustrates a phase winding circuit 400 of an electric machine including a plurality of series coupled sub-winding circuits 410,420,430 in accordance with the present disclosure.

FIG. 5 schematically illustrates a phase winding circuit 400 of an electric machine including a plurality of series coupled sub-winding circuits 410,420,430 in accordance with the present disclosure. Phase winding circuit 400 is one of three phase winding circuits 400,401,402 having a Y-configuration. Phase winding circuit 400 will be discussed herein, however, all methods and configurations with respect to phase winding circuit 400 are identically applied to phase winding circuits 401,402.

The phase winding circuit 400 is substantially similar to the phase winding circuit 200 discussed in FIG. 2 except that phase winding circuit 400 includes three series coupled sub-winding circuits 410,420,430. The sub-winding circuits 410, 420,430 include respective sub-windings 411,421,431 coupled in series with respective first controllable switches 412,422,432, and respective second controllable switches 413,423,433 coupled in parallel across the corresponding series coupled sub-windings 411,421,431 and first controllable switches 412,422,432. As described in the exemplary embodiment depicted in FIG. 3, the controllable switches are bi-directional switches operable between open and closed positions, the first controllable switches 412,422,432 and the second controllable switches 413,423,433 are never both in the open and closed positions at the same time.

The sub-winding circuits 410,420,430 are coupled in series, wherein phase winding circuit 400 has seven desirable winding turn ratios (i.e., seven effective turn ratios) based on respective combinations of winding turn ratios of three sub-windings 411 and/or 421 and/or 431 where each sub-winding 411,421,431 corresponds to a respective one of the three sub-winding circuits 410,420,430. Each respective winding turn ratio is different from the other winding turn ratios. Each of the seven desirable winding turn ratios include at least one of the three sub-winding circuits 410,420,430 in circuit. In other words, the respective winding turn ratios of each of the sub-windings 411,421,431 are selectively combinable to yield desirable winding turn ratios of the phase winding circuit 400 based on variations of at least one of the sub-winding circuits in circuit. Further, each of the seven desirable winding turn ratios (i.e., seven effective turn ratios) of the exemplary phase winding circuit 400 correspond to respective operating speed ranges of the electric machine. Hence, the phase circuit 400 including the three sub-winding circuits 430,420,410 is configurable between seven operating speed ranges of the electric machine. Therefore, transitions can occur between the variations of at least one of the sub-winding circuits 430,420,410 in circuit based on transitions between the desired winding turn ratios during transitions between the operating speed ranges of the electric machine. The transitioning between variations of at least one of the sub-winding circuits 430,420,410 in circuit selectively occurs when an in-phase current across the phase winding circuit is substantially zero. As aforementioned, when a sub-winding circuit is in circuit, the respective sub-winding is capable of being energized and contributing its respective winding turn ratio towards a desirable winding turn ratio (i.e., effective winding turn ratio).

The phase winding circuit 400 further includes a respective half-bridge 405 associated with an inverter to facilitate power flow to and from the electric machine. Specifically, the half-bridge can be coupled in series to the sub-winding circuit 430. Each of phase winding circuits 401,402 includes a respective half-bridge associated with the inverter to facilitate power flow to and from the electric machine.

Figure 6:
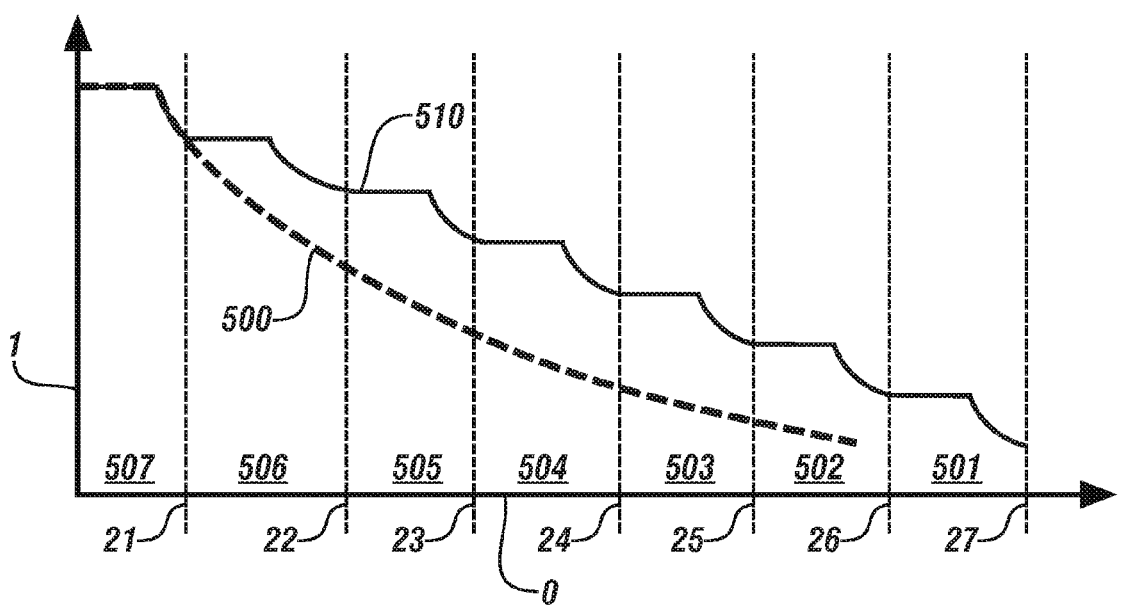
FIG. 6 graphically illustrates an increased torque capability profile 510 over an entire operating speed range of an electrical machine based on utilizing the phase circuit 400 of FIG. 4 in accordance with the present disclosure.

FIG. 6 graphically illustrates an increased torque capability profile 510 over an entire operating speed range of an electrical machine based on utilizing the phase circuit 400 of FIG. 4 in accordance with the present disclosure. The axis of ordinate 1 denotes torque. The axis of abscissa 0 denotes the operating speed range of the electric drive. Dashed line 500 denotes the torque profile without implementation of utilizing the three series coupled sub-winding circuits 410,420,430 selectively operable between seven desirable winding turn ratios (i.e., effective winding turn ratios) based on combinations of respective turn ratios of the three sub-windings 411, 421,431 when at least one of the three sub-winding circuits 410,420,431 are in circuit. Hence, a sub-winding is contributing toward a desired winding turn ratio when the respective sub-winding circuit is in circuit. Dashed vertical line 21 denotes a first speed range limit. Dashed vertical line 22 denotes a second speed range limit. Dashed vertical line 23 denotes a third speed range limit. Dashed vertical line 24 denotes a fourth speed range limit. Dashed vertical line 25 denotes a fifth speed range limit. Dashed vertical line 26 denotes a sixth speed range limit. Dashed vertical line 27 denotes a seventh speed range limit.

Area 507 encompasses a speed range less than the first speed range limit corresponding to operating Mode 1. Area 506 encompasses a speed range between the first and second speed range limits corresponding to operating Mode 2. Area 505 encompasses a speed range between the second and third speed range limits corresponding to operating Mode 3. Area 504 encompasses a speed range between the third and fourth speed range limits corresponding to operating Mode 4. Area 503 encompasses a speed range between the fourth and fifth speed range limits corresponding to operating Mode 5. Area 502 encompasses a speed range between the fifth and sixth speed range limits corresponding to operating Mode 6. Area 501 encompasses a speed range between the fifth and sixth speed range limits corresponding to operating Mode 7.

Table 2 is provided as a key of the series coupled sub-winding circuits 410,420,430 having seven desirable winding turn ratios based on combinations of respective turn ratios of the sub-windings 411,421,431 where each of the seven desirable winding turn ratios have at least one of the three sub-winding circuits 410,420,430 in circuit. Each of the seven desirable winding turn ratios (i.e., effective winding turn ratios) corresponds to respective ones of the seven operating speed ranges or modes. The numerically labeled blocks and the corresponding positions of the controllable switches with respect to the desired winding turn ratio, and corresponding operating mode are set forth as follows.

TABLE 2

| Mode | 413 | 412 | 423 | 422 | 433 | 432 | in-circuit |
|---|---|---|---|---|---|---|---|
| 1 | Open | Closed | Open | Closed | Open | Closed | 410, 420, 430 |
| 2 | Closed | Open | Open | Closed | Open | Closed | 420, 430 |
| 3 | Open | Closed | Closed | Open | Open | Closed | 410, 430 |
| 4 | Closed | Open | Closed | Open | Open | Closed | 430 |
| 5 | Open | Closed | Open | Closed | Closed | Open | 410, 420 |
| 6 | Closed | Open | Open | Closed | Closed | Open | 420 |
| 7 | Open | Closed | Closed | Open | Closed | Open | 410 |

The embodiments utilizing two and three series coupled sub-winding circuits depicted in FIGS. 3 and 5 are not limiting, and are merely illustrated as examples of a multi-phase winding circuit for an electric machine where each phase winding circuit includes a plurality of series coupled sub-winding circuits, each sub-winding circuit including a respective sub-winding coupled in series with a respective first controllable switch, and a respective second controllable switch coupled in parallel across the corresponding series coupled sub-winding and first controllable switch. Therefore, exemplary embodiments envisioned include utilizing scalable parameters to determine a number of sub-winding circuits per phase winding circuit, half bridges and bi-directional switches (i.e., first and second bi-directional switches) corresponding to a desired number of effective winding turn ratios of the phase circuit where each effective winding turn ratio corresponds to a respective operating speed range of the electric machine. Equations 1 and 2 listed below express the scalable parameters for determining a desired number of operating speed ranges or modes of the electric machine and the number of bi-directional switches, respectively. Thus, one can derive the number of operating speed ranges or modes if the number of sub-winding circuits (swc) is known, or the number of swc's can be derived if the number of operating speed ranges or modes is known as follows in Eq. 1.

$$\text{Modes} = 2^{(swc)} - 1 \quad [1]$$

The number of controllable switches (e.g., first and second controllable switches) per phase winding circuit can be derived if the number of sub-winding circuits (swc) per phase is known as follows in Eq. 2.

$$\text{Switches} = 2 \cdot swc \quad [2]$$

Embodiments envisioned include one half-bridge per phase winding circuit that is associated with an inverter. In a non-limiting example a three-phase winding circuit includes three half-bridges.

Table 3 is provided as a key of the scalable parameters for a single phase winding circuit in a three-phase electric machine, however, the scalable parameters can be determined for any multi-phase electric machine. The number of sub-winding circuits is not limited to those listed below in Table 3. It is appreciated that the desirable winding turn ratio (e.g., effective winding turn ratio) corresponding to the rotational speed of the electric machine includes the number of desirable winding turn ratios based on the number of sub-winding circuits. As illustrated, the scalable parameters include the number of sub-winding circuits, the number of operating modes or speed ranges of the electric machine, the number of half-bridges and the number of controllable switches (e.g., first and second controllable switches) are set forth as follows.

TABLE 3

| SWC | Modes | Half-bridges | Switches |
|---|---|---|---|
| 2 | 3 | 1 | 4 |
| 3 | 7 | 1 | 6 |
| 4 | 15 | 1 | 8 |

Embodiments envisioned include methods of operating a phase circuit for an electric machine over an entire operating range of the electric machine. In a non-limiting example, the phase circuit is a stator phase circuit for a permanent magnet electric machine having three-phase winding circuits arranged in a Y-configuration. Each phase winding circuit includes a plurality of series coupled sub-winding circuits, each sub-winding circuit including a respective sub-winding coupled in series with a respective first controllable switch, and a respective second controllable switch coupled in parallel across the corresponding series coupled sub-winding and first controllable switch, each sub-winding having a respective winding turn ratio. The method includes monitoring operating speed of the electric machine and comparing the monitored operating speed of the electric machine to a plurality of speed ranges where each speed range corresponds to a respective effective winding turn ratio (i.e., desired winding turn ratio) for each phase winding circuit. The effective winding turn ratio for each phase winding circuit is selected based on the comparison. It is appreciated that each speed range corresponding to a respective effective winding turn ratio includes each respective effective winding turn ratio corresponding to a respective combination of winding turn ratios of selected sub-windings, where the selected sub-windings correspond to respective sub-winding circuits in circuit when the first controllable switch (i.e., series switch) is closed and the second controllable switch (i.e., parallel switch) is open. In a non-limiting example, the number of speed ranges corresponding to respective effective winding turn ratios is three when two sub-winding circuits are utilized, seven when three sub-winding circuits are utilized and fifteen when four sub-winding circuits are utilized in accordance with Eq. 1 and Eq. 2.

Further embodiments include each speed range corresponding to a respective effective winding turn ratio to include combining winding turn ratios of selected sub-windings to yield linear progression of the effective winding turn ratio for each phase winding circuit as the operating speed of the electric machine increases. Combining winding turn ratios of selected sub-windings includes selectively closing the first controllable switch (i.e., series switch) and selectively opening the second controllable switch (i.e., parallel switch) simultaneously when a respective sub-winding is selected. In a non-limiting example, an electric machine starting from rest and accelerating to a top accelerating speed would require the electric machine to transition through a plurality of speed ranges in a linear progressive manner where each speed range corresponds to a respective effective winding turn ratio, each effective winding turn ratio having a respective combination of selected sub-windings when respective sub-winding circuits are in circuit.

Figure 7:
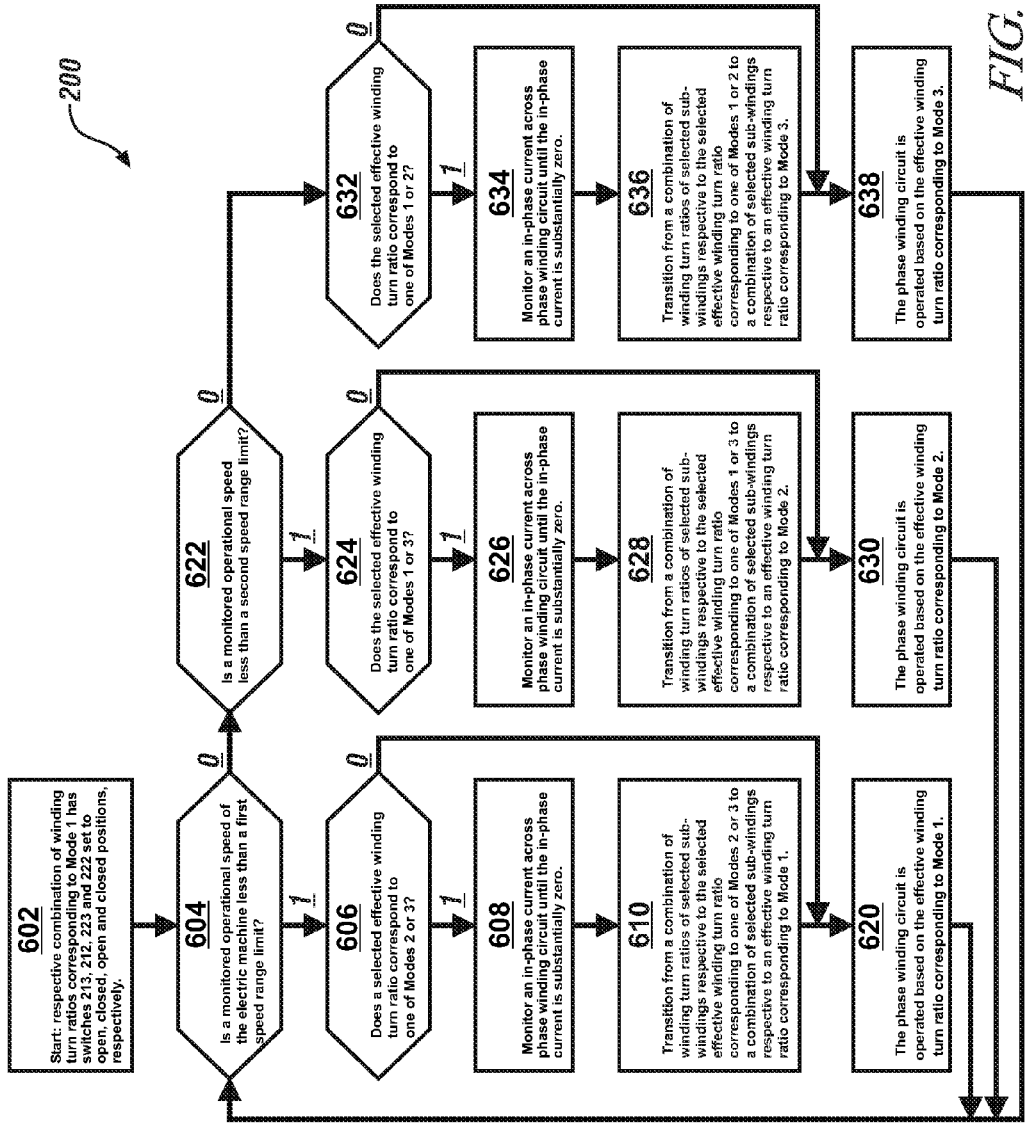
FIG. 7 illustrates a flowchart for operating a single phase of a multi-phase electric machine over an entire operating range in accordance with the present disclosure.

Referring to FIG. 7, a flowchart is depicted for operating a single phase of a multi-phase electric machine over an entire operating range in accordance with the present disclosure. Alternatively, the flowchart is equally applicable to any single or multi-phase electric machine. In an exemplary embodiment, flowchart 600 depicts operation of the phase winding circuit 200 of FIG. 2, and Table 1 associated therewith, over an entire operating range of the electric machine, including transitions between each of the three operating speed ranges or modes corresponding to respective effective winding turn ratios. The flowchart 600 equally applies to each of phase winding circuits 201,202. It is further appreciated that a similar flowchart can be utilized for the phase winding circuits 400,401,402 of FIG. 5 having seven effective winding turn ratios (e.g., desired winding turn ratios) corresponding to respective operating speed ranges or modes.

It will be appreciated that the flowchart 600 depicts operation of a single phase (e.g., phase winding circuit 200) transitioning between a plurality of speed ranges or modes where each speed range or mode corresponds to a respective effective winding turn ratio (e.g., desired winding turn ratio). In this non-limiting example, the plurality of speed ranges or modes is equal to three speed ranges or modes. In this non-limiting example, the plurality of speed ranges or modes is equal to three. Further, each effective winding turn ratio corresponds to a respective combination of winding turn ratios of selected sub-windings 211 and/or 221, the selected sub-windings 211 and/or 221 corresponding to respective sub-winding circuits 210 and/or 220 in circuit when the first controllable switch (i.e., series switch) 212 and/or 222 is closed and the second controllable switch (i.e., series switch) 213 and/or 223 is open. Further, the flowchart in FIG. 7 depicts combining winding turn ratios of selected sub-windings to yield linear progression of the effective winding turn ratio.

Table 4 is provided as a key wherein the numerically labeled blocks and the corresponding functions are set forth as follows.

TABLE 4

FIG. 7

| BLOCK | BLOCK CONTENTS |
|---|---|
| 602 | Start: respective combination of winding turn ratios corresponding to Mode 1 has switches 213, 212, 223 and 222 set to open, closed, open and closed positions, respectively. |
| 604 | A monitored operational speed of the electric machine is compared to a first speed range limit. If a "yes" indicated by"1", the monitored operational speed is less than the first speed range limit and proceeds to decision block 606. A "no" indicated by "0", the monitored operational speed is at least the first speed range limit and proceeds to decision block 622 |
| 606 | Determines whether the selected effective winding turn ratio corresponds to one of Modes 2 or 3. If a "yes" indicated by "1", the flow chart proceeds to block 608. If a "no" indicated by "0", the flow chart proceeds to block 620. |
| 608 | Monitoring an in-phase current across phase winding circuit (e.g., 200) until the in-phase current is substantially zero before proceeding to block 610. |
| 610 | Transitioning from a combination of winding turn ratios of selected sub-windings respective to the selected effective winding turn ratio corresponding to one of Modes 2 or 3 to a combination of selected sub-windings respective to an effective winding turn ratio corresponding to Mode 1, having switches 213, 212, 223 and 222 set to open, closed, open and closed positions, respectively. Proceeds to block 620 |
| 620 | The phase winding circuit is operated based on the effective winding turn ratio corresponding to Mode 1. Proceeds back to block 604 |
| 622 | A monitored operational speed of the electric machine is compared to a second speed range limit. If a "yes" indicated by"1", the monitored operational speed is less than the second speed range limit and proceeds to decision block 624. A "no" indicated by "0", the monitored operational speed is at least the second speed range limit and proceeds to decision block 632. |
| 624 | Determines whether the selected effective winding turn ratio corresponds to one of Modes 1 or 3. If a "yes" indicated by "1", the flow chart proceeds to block 626. If a "no" indicated by "0", the flow chart proceeds to block 630. |
| 626 | Monitoring an in-phase current across phase winding circuit (e.g., 200) until the in-phase current is substantially zero before proceeding to block 628. |
| 628 | Transitioning from a combination of winding turn ratios of selected sub-windings respective to the selected effective winding turn ratio corresponding to one of Modes 1 or 3 to a combination of selected sub-windings respective to an effective winding turn ratio corresponding to Mode 2, having switches 213, 212, 223 and 222 set to closed, open, open and closed positions, respectively. Proceeds to block 630. |
| 630 | The phase winding circuit is operated based on the effective winding turn ratio corresponding to Mode 2. Proceeds back to block 604. |
| 632 | Determines whether the selected effective winding turn ratio corresponds to one of Modes 1 or 2. If a "yes" indicated by "1", the flow chart proceeds to block 634. If a "no" indicated by "0", the flow chart proceeds to block 638. |
| 634 | Monitoring an in-phase current across phase winding circuit (e.g., 200) until the in-phase current is substantially zero before proceeding to block 636. |
| 636 | Transitioning from a combination of winding turn ratios of selected sub-windings respective to the selected effective winding turn ratio corresponding to one of Modes 1 or 2 to a combination of selected sub-windings respective to an effective |

TABLE 4-continued

FIG. 7

| BLOCK | BLOCK CONTENTS |
|---|---|
|  | winding turn ratio corresponding to Mode 3, having switches 213, 212, 223 and 222 set to open, closed, closed and open positions, respectively. Proceeds to block 638. |
| 638 | The phase winding circuit is operated based on the effective winding turn ratio corresponding to Mode 3. Proceeds back to block 604. |

Referring to block 602, operation of the electric machine is started. The electric machine starting from rest will always begin in block 604. A respective combination of winding turn ratios of selected sub-windings 211 and 211 having a respective effective winding turn ratio corresponding to Mode 1 (e.g., 301 in FIG. 4). Selected sub-windings 211 and 221 include the controllable switches 213,212,223,222 set to open, closed, open, closed positions, respectively. Hence, it is appreciated that the electric machine is operating in the low-speed range.

Referring to decision block 604, the monitored operational speed of the electric machine is compared to a first speed range limit. During ongoing operation of the electric machine, except in the condition that the electric machine starts from rest (i.e., block 602), the flow chart always cyclically begins analysis in decision block 604. The first speed range limit is indicated by dashed vertical line 10 in FIG. 4. If a "yes" indicated by "1", the monitored operational speed of the electric machine is less than the first speed range limit and proceeds to decision block 606. Hence, the electric machine is operating in a speed range corresponding to Mode 1. If a "no" indicated by "0", the monitored operational speed of the electric machine is at least the first speed range limit and proceeds to decision block 622. Hence, the electric machine is operating within a speed range corresponding to one of Modes 2 or 3. Thus, an effective winding turn ratio of the phase winding circuit can later be selected corresponding to one of Modes 2 or 3 (i.e., mid-speed and high-speed ranges, respectively) based on a comparing in decision block 622, discussed in greater detail below.

Referring to decision block 606, it is determined whether the selected effective winding turn ratio corresponds to one of Modes 2 or 3. If a "yes" indicated by "1", the flow chart proceeds to block 608 because transitioning from the selected effective winding turn ratio corresponding to one of Modes 2 or 3 to an effective winding turn ratio corresponding to Mode 1 must occur because the monitored operating speed of the electric machine is not within the speed range corresponding to the selected effective winding turn ratio corresponding to one of Modes 2 or 3, but is within the speed range corresponding to Mode 1. If a "no" indicated by "0", the flow chart proceeds to block 620 because it is determined that the selected effective winding turn ratio already corresponds to Mode 1. Hence, the selected effective winding turn ratio corresponding to Mode 1 is maintained when the monitored operational speed of the electric machine remains within the speed range corresponding to Mode 1.

Referring to block 608, an in-phase current across the phase winding circuit is monitored. When the monitored in-phase current is substantially zero, the flowchart proceeds to block 610.

Referring to block 610, transitioning from a combination of winding turn ratios of selected sub-windings respective to the selected effective winding turn ratio corresponding to one of Modes 2 or 3 to a combination of selected sub-windings respective to an effective winding turn ratio corresponding to Mode 1 occurs because the monitored operating speed range of the electric machine is not within the speed range corresponding to the selected effective winding turn ratio (e.g., one of Modes 2 or 3). Selected sub-windings 211 and 221 (i.e., sub-winding circuits 210,220 in circuit) include the controllable switches 213,212,223,222 set to open, closed, open, closed positions, respectively. Hence, the winding turn ratios of sub-windings 211 and 221 when sub-winding circuits 210 and 220 are in circuit contribute to the effective winding turn ratio of the phase winding circuit 200 corresponding to Mode 1. After the transition, or maintaining the selected effective winding turn ratio if decision block 606 was a "no" indicated by a "0", the electric machine is powered by the half-bridge 205 and associated inverter, where the flowchart reverts back to decision block 604. This configuration is additionally depicted in Table 1.

Referring to decision block 622, the monitored operational speed of the electric machine is compared to a second speed range limit. The second speed range limit is indicated by dashed vertical line 12 in FIG. 4. If a "yes" indicated by "1", the monitored operational speed of the electric machine is less than the second speed range limit and proceeds to decision block 624. It is appreciated that the monitored operational speed of the electric machine is also at least the first speed range limit as indicated by decision block 604. Hence, the electric machine is operating in a speed range corresponding to Mode 2. If a "no" indicated by "0", the monitored operational speed of the electric machine is at least the second speed range limit and proceeds to decision block 632. Hence, the electric machine is operating within a speed range corresponding to Mode 3. Thus, an effective winding turn ratio of the phase winding circuit can later be selected corresponding to Mode 3 (high-speed range) based on the comparing in decision blocks 604 and 622, discussed in greater detail below.

Referring to decision block 624, it is determined whether the selected effective winding turn ratio corresponds to one of Modes 1 or 3. If a "yes" indicated by "1", the flow chart proceeds to block 626 because transitioning from the selected effective winding turn ratio corresponding to one of Modes 1 or 3 to an effective winding turn ratio corresponding to Mode 2 must occur because the monitored operating speed of the electric machine is not within the speed range corresponding to the selected effective winding turn ratio corresponding to one of Modes 1 or 3, but is within the speed range corresponding to Mode 2. If a "no" indicated by "0", the flow chart proceeds to block 630 because it is determined that the selected effective winding turn ratio already corresponds to Mode 2. Hence, the selected effective winding turn ratio corresponding to Mode 2 is maintained when the monitored operational speed of the electric machine remains within the speed range corresponding to Mode 2.

Referring to block 626, an in-phase current across the phase winding circuit is monitored. When the monitored in-phase current is substantially zero, the flowchart proceeds to block 628.

Referring to block 628, transitioning from a combination of winding turn ratios of selected sub-windings respective to the selected effective winding turn ratio corresponding to one of Modes 1 or 3 to a combination of selected sub-windings respective to an effective winding turn ratio corresponding to Mode 2 occurs because the monitored operating speed of the electric machine is not within the speed range corresponding to the selected effective winding turn ratio (e.g., Modes 1 or 3). Selected sub-winding 221 (i.e., sub-winding circuit 220 is in circuit) includes the controllable switches 213,212,223, 222 set to closed, open, open and closed positions, respectively. Proceeds to block 630. Hence, the winding turn ratio of sub-winding 221 when sub-winding circuit 220 is in circuit contributes to the effective winding turn ratio of the phase winding circuit 200 corresponding to Mode 2. After the transition, or maintaining the selected effective winding turn ratio if decision block 624 was a "no" indicated by a "0", the electric machine is powered by the half-bridge 205 and associated inverter, where the flowchart reverts back to decision block 604. This configuration is additionally depicted in Table 1.

Referring to decision block 632, decision block 622 has determined the monitored operational speed of the electric machine is at least the second speed range limit, indicated by "0". Decision block 632 determines whether the selected effective winding turn ratio corresponds to one of Modes 1 or 2. If a "yes" indicated by "1", the flow chart proceeds to block 634 because transitioning from the selected effective winding turn ratio corresponding to one of Modes 1 or 2 to an effective winding turn ratio corresponding to Mode 3 must occur because the monitored operating speed of the electric machine is not within the speed range corresponding to the selected effective winding turn ratio corresponding to one of Modes 1 or 2, but is within the speed range corresponding to Mode 3. If a "no" indicated by "0", the flow chart proceeds to block 638 because it is determined that the selected effective winding turn ratio already corresponds to Mode 3. Hence, the selected effective winding turn ratio corresponding to Mode 3 is maintained when the monitored operational speed of the electric machine remains within the speed range corresponding to Mode 3.

Referring to block 634, an in-phase current across the phase winding circuit is monitored. When the monitored in-phase current is substantially zero, the flowchart proceeds to block 636.

Referring to block 636, transitioning from a combination of winding turn ratios of selected sub-windings respective to the selected effective winding turn ratio corresponding to one of Modes 1 or 2 to a combination of selected sub-windings respective to an effective winding turn ratio corresponding to Mode 3 occurs because the monitored operating speed of the electric machine is not within the speed range corresponding to the selected effective winding turn ratio (e.g., one of Modes 1 or 2). Selected sub-winding 211 (i.e., sub-winding circuit 210 is in circuit) includes the controllable switches 213,212, 223,222 set to open, closed, closed and open positions, respectively. Proceeds to block 638. Hence, the winding turn ratio of sub-winding 211 when sub-winding circuit 210 is in circuit contributes to the effective winding turn ratio of the phase winding circuit 200 corresponding to Mode 3. After the transition, or maintaining the selected effective winding turn ratio if decision block 632 was a "no" indicated by a "0", the electric machine is powered by the half-bridge 205 and associated inverter, where the flowchart reverts back to decision block 604. This configuration is additionally depicted in Table 1.

It is appreciated that the flowchart 600 illustrated in FIG. 7 corresponds to phase winding circuit 200 illustrated in FIG. 3, that includes two sub-winding circuits 210,220 capable of three effective winding turn ratios (i.e., desired winding turn ratios). Identically, this flowchart is utilized for phase winding circuits 201,202 where all transitions (switching) occur in each of the phase winding circuits 200,201,202 when the in-phase current across each phase winding circuit is substantially zero. Likewise, this flowchart 600 can be applied to any multi-phase electric machine. Similarly, the flowchart 600 depicted in FIG. 7 can be adapted for operating the phase winding circuit illustrated in FIG. 5, that includes three sub-winding circuits 410,420,430 capable of seven effective winding turn ratios (i.e., desired winding turn ratios). Further, the flowchart 600 depicted in FIG. 7 can be adapted for operating a phase winding circuit to achieve any number of desirable or effective winding turn ratios based on the number of sub-winding circuits utilizing Eq. 1.

Figure 8:
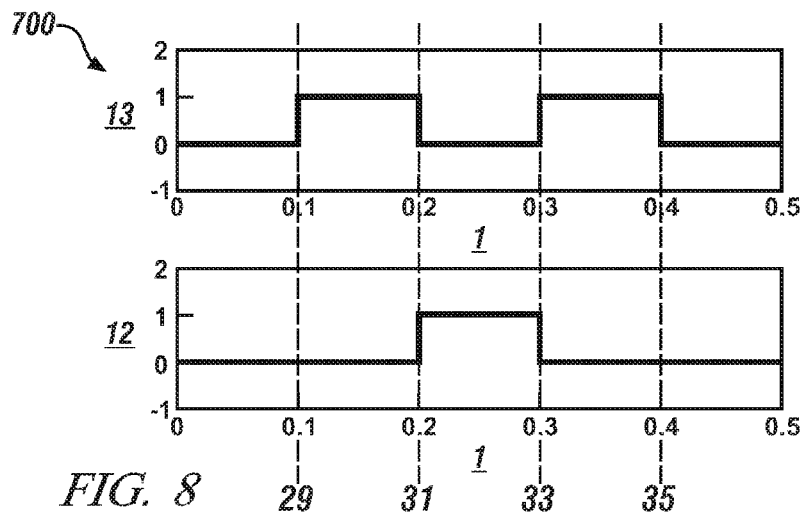
FIG. 8 illustrates exemplary simulation data of positions of second controllable switches 13,12 of respective sub-winding circuits during transitions between operating speed ranges or modes in accordance with the present disclosure.

Referring to FIG. 8, exemplary simulation data depicting the positions of second controllable switches (i.e., parallel switches) 13,12 of respective sub-winding circuits during transitions between operating speed ranges or modes in accordance with an exemplary embodiment. In a non-limiting example, the second controllable switches 13,12 correspond to the second controllable switches 213,223, respectively, of the phase winding circuit 200 discussed above with reference to FIG. 3. As aforementioned, sub-winding circuits can also include the first controllable switches to assist in managing circulating currents among the plurality of series coupled sub-winding circuits transitioning from being in-circuit to out-of-circuit during transitions between operating speed ranges of the electrical machine. The utilization of the second controllable switch (i.e., parallel switch) by itself can be tedious for managing the circulating currents due to torque disturbances from large voltages induced during the transitions. Hence, if a series switch (i.e., first controllable switch) is utilized within the respective sub-winding circuit it will always be in a position other than the position of the respective second controllable switches 13 or 12. When a second controllable switch switches to one of an open or closed position within a respective sub-winding circuit, a first controllable switch simultaneously switches to the other one of the open or closed position within the respective sub-winding circuit.

The axis of ordinate for each of the second controllable switches 12,13 indicates the position (i.e., open or closed). A "0" corresponding to the open position. A "1" corresponding to the closed position. The axis of abscissa denoted by 1 corresponds to time in seconds. The area to the left of vertical dashed line 29 indicates a first speed range or mode. In a non-limiting example, the first speed range or mode corresponds to area 301 encompassing the low-speed range in FIG. 4. The area between vertical dashed lines 29 and 31 indicates a second speed range or mode. In a non-limiting example, the second speed range or mode corresponds to area 302 encompassing the mid-speed range in FIG. 4. The area between vertical dashed lines 31 and 33 indicates a third speed range or mode. In a non-limiting example, the third speed range or mode corresponds to area 303 encompassing the high-speed range in FIG. 4. The area between vertical dashed lines 33 and 35 indicates the second speed range or mode. The area to the right of vertical dashed line 35 indicates the first speed range or mode. In other words, each of vertical dashed lines 29,31, 33 and 35 indicate a transition into a different speed range or mode where switching, if required, occurs in at least one of controllable switches 13,12. It is understood that the switching places at least one of two sub-winding circuits in circuit to yield a desirable winding turn ratio of the phase winding circuit respective to the operating speed range or mode of the electric machine. Further, the transitions at each of vertical dashed lines 29,31,33 and 35 occurs when an in-phase current across the phase winding circuit is substantially zero, and therefore, transitions occur in the other phase winding circuits of a multi-phase electric machine in an identical manner when the in-phase current across each respective phase winding circuit is substantially zero.

Figure 9:
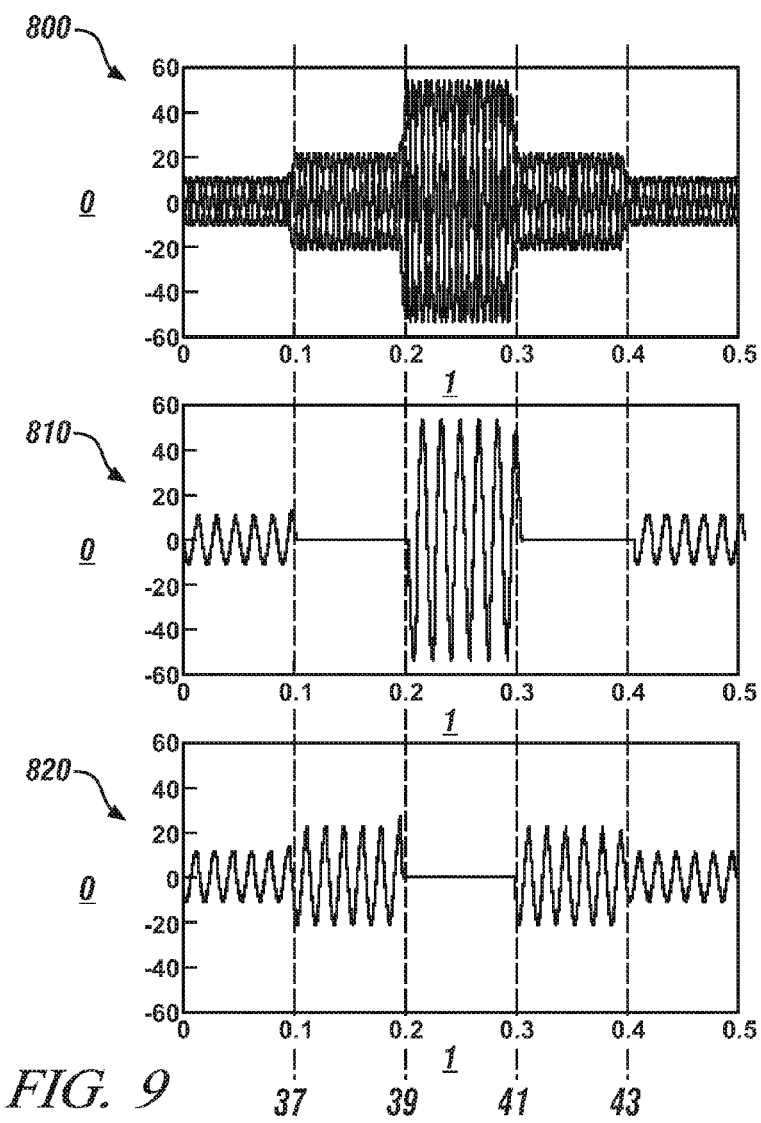
FIG. 9 illustrates exemplary simulation data of in-phase currents in a three-phase electrical machine 800 and first and second sub-winding circuits 810,820, respectively, of a single phase of the three-phase electrical machine in accordance with the present disclosure.

Referring to FIG. 9, exemplary simulation data depicting in-phase currents 800 in a three-phase electric machine and first and second sub-winding circuits currents 810,820, respectively, of a single phase winding circuit of a multi-phase electric machine. In a non-limiting example, the electric machine three-phase currents 800 corresponds to current in each of the phase winding circuits 200,201,202 depicted in FIG. 3. In a non-limiting example, first and second sub-winding circuits currents 810,820, respectively, correspond to currents in sub-winding circuits 210,220 of phase winding circuit 200 depicted in FIG. 3. The area to the left of vertical dashed line 37 indicates a first speed range or mode. In a non-limiting example, the first speed range or mode corresponds to area 301 encompassing the low-speed range in FIG. 4. The area between vertical dashed lines 37 and 39 indicates a second speed range or mode. In a non-limiting example, the second speed range or mode corresponds to area 302 encompassing the mid-speed range in FIG. 4. The area between vertical dashed lines 39 and 41 indicates a third speed range or mode. In a non-limiting example, the third speed range or mode corresponds to area 303 encompassing the high-speed range in FIG. 4. The area between vertical dashed lines 41 and 43 indicates the second speed range or mode. The area to the right of vertical dashed line 43 indicates the first speed range or mode.

Figure 10:
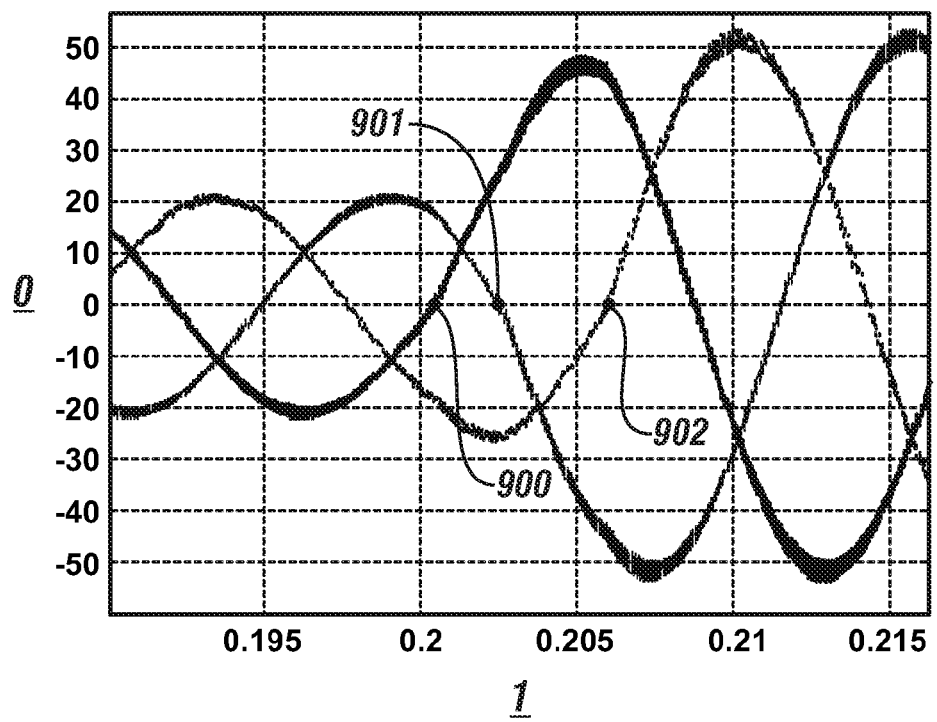
FIGS. 10 and 11 graphically illustrate exemplary simulation data of in-phase currents in a three-phase electrical machine and the points at which transitions occur between operating speed ranges or modes in each of the three phases of the electrical machine in accordance with the present disclosure.
Figure 11:
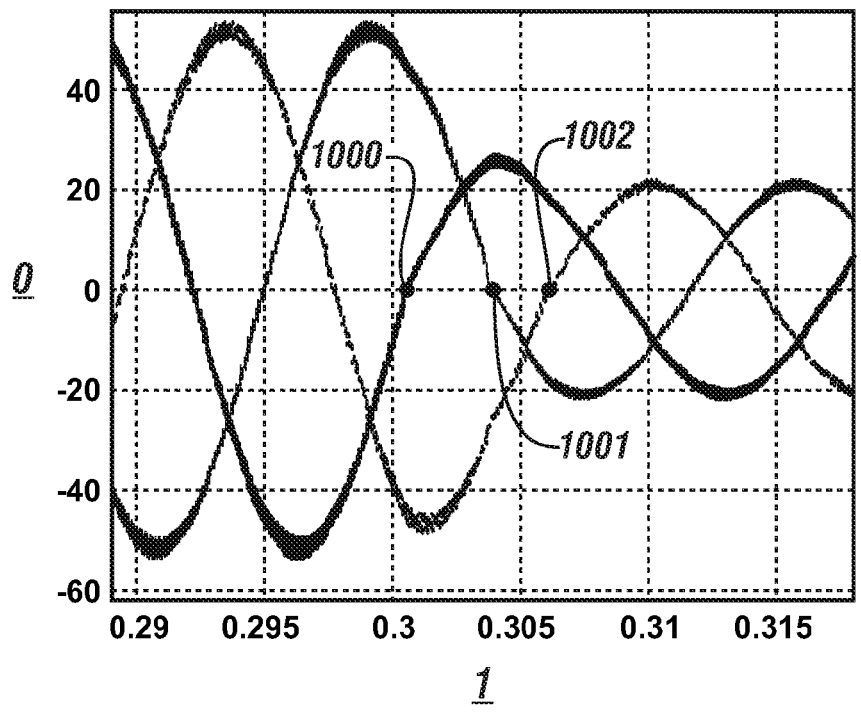

FIGS. 10 and 11 exemplary simulation data depicting in-phase currents in a three-phase electric machine and the points where a transition between operating speed ranges or modes of the electric machine occur where each phase winding circuits utilizes two sub-winding circuits is illustrated in accordance with the present disclosure. FIG. 10 depicts a transition from a mid-speed range to a high-speed range. In a non-limiting example, the transition from the mid-speed range to the high-speed range corresponds to the transition between area 302 and 303 at vertical dashed line 12 depicted in FIG. 4. The transition from the mid-speed range to the high-speed range requires a second controllable switch (e.g., second controllable switch 213) of a respective sub-winding circuit (e.g., sub-winding circuit 210) to switch from a closed position to an open position and a second controllable switch (e.g., second controllable switch 223) of a respective sub-winding circuit (e.g., sub-winding circuit 220) to switch from an open position to a closed position. This transition occurs in each of the three phase winding circuits when the in-phase current across each phase winding circuit is substantially zero at points 900,901,902, respectively. It is appreciated that if the respective sub-winding circuits utilize a first controllable switch, the first controllable switch is never in a position the same as the position of the respective second controllable switch.

FIG. 11 depicts a transition from a high-speed range to a mid-speed range. In a non-limiting example, the transition from the high-speed range to the mid-speed range corresponds to the transition between area 303 and 302 at vertical dashed line 12 depicted in FIG. 4. The transition from the high-speed range to the mid-speed range requires a second controllable switch (e.g., second controllable switch 213) of a respective sub-winding circuit (e.g., sub-winding circuit 210) to switch from an open position to a closed position and a second controllable switch (e.g., second controllable switch 223) of a respective sub-winding circuit (e.g., sub-winding circuit 220) to switch from a closed position to an open position. This transition occurs in each of the three-phase winding circuits when the in-phase current across each phase winding circuit is substantially zero at points 1000,1001, 1002, respectively. It is appreciated that if the respective sub-winding circuits utilize a first controllable switch, the first controllable switch is never in a position the same as the position of the respective second controllable switch.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A stator phase circuit for an electric machine, comprising:
   a phase winding circuit for a single phase comprising a plurality of series coupled sub-winding circuits, each sub-winding circuit comprising only one respective sub-winding coupled in parallel across a respective first controllable switch of only the corresponding sub-winding circuit, wherein respective winding turn ratios of the respective sub-windings are selectively combinable to provide a plurality of effective winding turn ratios of the phase winding circuit for the single phase based on at least one of the series coupled sub-winding circuits in circuit only when the respective first controllable switch is open; and
   a half-bridge respective only to the phase winding circuit for the single phase and coupled in series with one of the series coupled sub-winding circuits.

2. The stator phase circuit of claim 1 further comprising:
   a respective second controllable switch coupled in series with each respective sub-winding, wherein the respective first controllable switch is coupled in parallel across the corresponding series coupled sub-winding and second controllable switch.

3. The stator phase circuit of claim 2 wherein the first and second controllable switches are bi-directional switches operable in open and closed states, and wherein the respective first and second controllable switches of each sub-winding circuit are never both in the open and closed states simultaneously.

4. The stator phase circuit of claim 1 wherein the phase winding circuit comprises two sub-winding circuits coupled in series, the phase winding circuit providing three effective winding turn ratios based on respective combinations of the respective sub-windings of the two sub-winding circuits.

5. The stator phase circuit of claim 4 wherein the phase winding circuit having three effective winding turn ratios based on respective combinations of the respective sub-windings of the two sub-winding circuits comprises each of the three effective winding turn ratios having at least one of the two sub-winding circuits in circuit.

6. The stator phase circuit of claim 1 wherein the phase winding circuit comprises three sub-winding circuits coupled in series, the phase winding circuit providing seven effective winding turn ratios based on respective combinations of the respective sub-windings of the three sub-winding circuits.

7. The stator phase circuit of claim 6 wherein the phase winding circuit having seven effective winding turn ratios based on respective combinations of the respective sub-windings of the three sub-winding circuits comprises each of the seven effective winding turn ratios having at least one of the three sub-winding circuits in circuit.

8. A multi-phase winding circuit for an electric machine, comprising:

a plurality of phase winding circuits, each respective phase winding circuit for a respective single phase and comprising a plurality of series coupled sub-winding circuits, each respective sub-winding circuit comprising a respective first controllable switch coupled in series with only one respective sub-winding and a respective second controllable switch of only the corresponding sub-winding circuit coupled in parallel across the corresponding series coupled first controllable switch and sub-winding, wherein the first and second controllable switches are bi-directional switches operable in open and closed states, and wherein the respective first and second controllable switches of each sub-winding circuit are never both in the open and closed states simultaneously, and wherein respective winding turn ratios of the respective sub-windings are selectively combinable to provide a plurality of effective winding turn ratios of the phase winding circuit for the single phase based on at least one of the series coupled sub-winding circuits in circuit only when the respective second controllable switch is open; and a plurality of half bridges, each half-bridge respective only to one of the phase winding circuits for the respective single phase and coupled in series with one of the series coupled sub-winding circuits.

9. The multi-phase winding circuit of claim 8 wherein the electric machine comprises one of an induction motor, a permanent magnet electrical machine, and a wound rotor synchronous machine.

10. The multi-phase winding circuit of claim 8 wherein each respective winding turn ratio of the respective sub-windings is different from each other sub-winding of the respective phase winding circuit.

11. The multi-phase winding circuit of claim 10 wherein the respective winding turn ratios are selectively combinable to yield a linearly progressive effective winding turn ratio for each phase winding circuit.

12. Method of operating an electric machine comprising a phase winding circuit having a plurality of series coupled sub-winding circuits, each respective sub-winding circuit for a respective single phase and comprising a respective first controllable switch coupled in series with only one respective sub-winding and a respective second controllable switch of only the corresponding sub-winding circuit coupled in parallel across the corresponding series coupled first controllable switch and sub-winding, the method comprising:

selecting an effective winding turn ratio for the phase winding circuit comprising a series combination of at least one of said sub-windings in circuit only when the respective second controllable switch is open, wherein respective winding turn ratios of the respective sub-windings are selectively combinable to provide the selected effective winding turn ratio of the phase winding circuit for the respective single phase; and controlling each switch of the phase winding circuit to provide the effective turn ratio.

13. The method of claim 12 wherein selecting the effective winding turn ratio comprises:

monitoring motor speed; and selecting the effective winding turn ratio based on the motor speed.

14. The method of claim 12 wherein controlling each switch of the phase winding circuit comprises:

switching each switch of the phase winding circuit when an in-phase current across the phase winding circuit is substantially zero.

\* \* \* \* \*